United States Patent [19]

Fraser

[11] Patent Number: 4,623,326
[45] Date of Patent: Nov. 18, 1986

[54] CENTRIFUGAL CONTAMINANT SEPARATION FOR A LUBRICATING SYSTEM

[75] Inventor: Bruce A. Fraser, Manlius, N.Y.

[73] Assignee: Carrier Corporation, Syracuse, N.Y.

[21] Appl. No.: 784,294

[22] Filed: Oct. 7, 1985

[51] Int. Cl.[4] ................ B01D 45/12; B04B 1/00; B04B 5/12
[52] U.S. Cl. .................... 494/34; 210/360.1; 494/83; 494/85
[58] Field of Search .............. 210/781, 168, 360.1, 210/360.2, 369, 372, 374, 377, 378, 379, 380.1; 494/31, 34, 83, 84, 85

[56] References Cited

U.S. PATENT DOCUMENTS 1,923,454 8/1933 Peltzer et al. ............... 494/34

Primary Examiner—Frank Sever
Attorney, Agent, or Firm—David J. Zobkiw

[57] ABSTRACT

Oil is subjected to at least one centrifugal separation to remove contaminants prior to its being supplied to the lubricating system. Additionally, there is at least a portion of the flow that is returned to the sump after separation without its being circulated for lubricating purposes. All of the contaminant collection areas are in a noncritical area in an area of continuous flow and located so as not to return contaminants to the oil sump.

4 Claims, 1 Drawing Figure

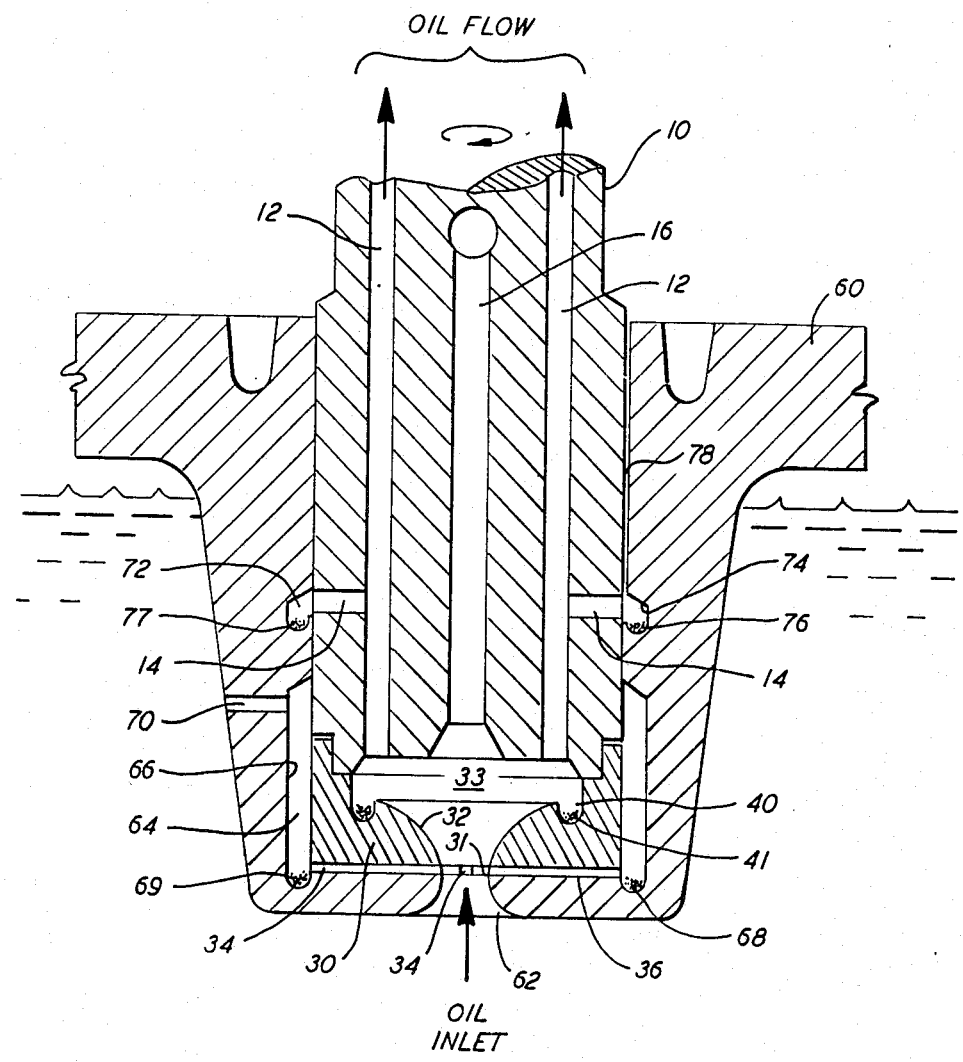

CENTRIFUGAL CONTAMINANT SEPARATION FOR A LUBRICATING SYSTEM

BACKGROUND OF THE INVENTION

In the manufacture and machining of parts, metal filings, or the like, are formed and some of these filings may adhere to the parts through the assembly process. Additionally, filings, or the like, are formed in the operation of the device due to wear. These filings are typically picked up by the circulating lubricant and can be circulated with the oil as contaminants. Some parts, such as bearings, are subject to failure due to the presence of these contaminants in the oil circulated to them. Various schemes have been developed to prevent the circulation of these abrasive contaminants to the vulnerable parts. Typically, centrifugal force is used to deposit the contaminants in a collection area defined by a bore and chamber which together define a blind passage.

SUMMARY OF THE INVENTION

The present invention is directed to a multi-stage contaminant separation and collection system for removing contaminants from a lubrication system. Specifically, the contaminants are centrifugally separated out and collected in noncritical areas. The oil is divided into a plurality of flow paths, each with at least one centrifugal separation section, but only one of the flow paths is for lubricating the device. The other flow path is solely for the removing of contaminants and returns the treated oil to the sump. The flow path serving solely for contaminant removal is located upstream of the lubricating flow path and centrifugally fed. As a result, oil in the lubricating path has been subjected to centrifugal separating forces both prior to entering the lubricating path as well as when in the lubricating path.

It is an object of this invention to centrifugally separate out and collect contaminants in noncritical areas.

It is another object of this invention to subject the oil to centrifugal separation prior to its entrance into the oil galleys of the crankshaft.

It is a further object of this invention to remove contaminants without returning them to the sump.

It is another object of this invention to divide the lubricant flow such that a portion of the lubricant is only treated for contaminant removal before being returned to the sump. These objects, and others as will become apparent hereinafter, are accomplished by the present invention.

Basically, oil is drawn into the inlet of the bearing head from the oil sump by the forces created by the rotating crankshaft. The lubrication distribution annulus is attached to and rotates with the crankshaft. A plurality of radial grooves are formed in the distribution members and rotation of the annulus creates centrifugal forces causing a portion of the oil to pass through a first flow path, defined, in part, by the radial grooves, and return to the sump after depositing entrained contaminants in an annular contaminant collection groove. The remainder of the oil enters the annulus where it is directed outwardly over the wall of a second annular contaminant collection groove before entering axially directed oil galleys which are located radially outward of the axis of rotation of the crankshaft. Each of the oil galleys has a radially directed bore providing a fluid path to a common annular contaminant collection groove formed in the surrounding bearing head. A slot is formed in the bearing head to provide a continuous flow of oil past the common annular contaminant collection groove.

BRIEF DESCRIPTION OF THE DRAWING

For a fuller understanding of the present invention, reference should now be made to the following detailed description thereof taken in conjunction with the accompanying drawing wherein:

The FIGURE is a sectional view of a portion of the bearing head and crankshaft of a compressor.

DESCRIPTION OF THE PREFERRED EMBODIMENT

In the FIGURE, the numeral 10 generally designates the crankshaft of a compressor. Attached to the end of crankshaft 10 and rotating therewith as a unit is a distribution annulus 30. Crankshaft 10 is received in and supported by bearing head 60. Bearing head 60 has an oil inlet 62 formed therein which forms the converging portion of a converging-diverging flow path defined by inlet 62 and opening 32 in distribution annulus 30. The converging-diverging flow path discharges into supply chamber 33 defined by annulus 30 and crankshaft 10. At the interface of bearing head 60 and distribution annulus 30, and at a location corresponding to the throat 31 of the converging-diverging flow path, a plurality of radially extending grooves 34 are formed in the face 36 of annulus 30. Grooves 34 terminate at annular chamber 64 which is defined by a recess 66 formed in bearing head 60. The bottom portion 68 of recess 66 defines an annular contaminant collection groove. A radial bore 70 in bearing head 60 defines the outlet from annular chamber 64 whereby oil entering grooves 34 can be returned to the sump after the contaminants are separated therefrom.

Oil entering diverging opening 32 of rotating distribution annulus 30 is forced outwardly over annular contaminant collection groove 40 and into supply chamber 33 before entering oil galleys 12 which axially extend through at least a portion of crankshaft 10 at point(s) radially outward of the axis of rotation of crankshaft 10. The total cross-sectional area of the oil galleys 12 is less than that of throat 31. Radial bores 14 extend radially outward from each of the oil galleys 12 to an annular chamber 72 defined by a recess 74 formed in bearing head 60. The bottom portion 76 of recess 74 defines an annular contaminant collection groove. An axially extending slot or groove 78 formed in bearing head 60 defines the outlet from annular chamber 74. Bore 16 is essentially coaxial with the axis of rotation of the crankshaft 10 and permits the venting of separated refrigerant at a point above the bearing head 60.

In operation, crankshaft 10 and distribution annulus 30 would be rotated as a unit about the axis of rotation of crankshaft 10 by the compressor motor (not illustrated). Converging oil inlet 62 extends beneath the surface of the oil in the sump such that oil is drawn upwardly due to centrifugal force created by the rotation of the crankshaft and distribution annulus. The area of the flow path through the distribution annulus is large relative to the total area of the oil galleys 12 so that oil velocities are lower in the areas where the separation of contaminants can occur. Also, the converging-diverging flow path defined by inlet 62 and annular opening 32 provide a smooth flow area to minimize turbulence in the initial separation areas. A portion of the oil thus drawn into inlet 62 passes radially outward through grooves 34 to annular chamber 64 where the entrained contaminants 69 tend to fall to the bottom portion 68 of recess 66. The cleaned oil then passes from chamber 64 via radial bore 70 and is returned to the sump. The remainder of the oil drawn into inlet 62 enters into diverging opening 32 where contaminants 41 tend to separate and settle out at the bottom of annular contaminant collection groove 40. Additionally, refrigerant also entrained in the oil is separated out and passes upwardly through bore 16 and is vented within the compressor shell (not illustrated). It should be noted that all of the oil entering inlet 62 has now been subjected to a centrifugal separation, but none of it has been distributed for lubrication purposes, yet. The cleaned oil enters oil galleys 12 which lead to conventional oil distribution structure. However, at an intermediate point along oil galleys 12, a radial bore 14 provides fluid communication between the respective oil galleys 12 and annular chamber 72 whereby a second stage of contaminant separation takes place and a portion of the oil previously cleaned by depositing contaminants 41 in groove 40 is supplied to annular chamber 72. Any remaining contaminants 77 in the oil tend to settle to the bottom 76 of chamber 72. A slot 78 which is preferably formed in bearing head 60 provides a fluid path from chamber 72 either back to the sump or to the lubricant distribution structure as necessary, or desired.

Although a preferred embodiment of the present invention has been illustrated and described, other changes will occur to those skilled in the art. It is, therefore, intended that the present invention is to be limited only by the scope of the appended claims.

What is claimed is:

1. A multi-stage centrifugal contaminant separation system for a lubricant supply comprising:
   a source of lubricant;
   bearing head means including a converging inlet extending into said source of lubricant;
   crankshaft means adapted to be rotated about an axis and including an end within said bearing head means and a portion received in a bearing relationship by said bearing head means;
   distribution annulus means within said bearing head means secured to said end and rotatable with said crankshaft means;
   a supply chamber defined by said end and said distribution annulus means;
   said annulus means and said converging inlet coacting to define a converging-diverging flow path including a throat section at the interface of said bearing head means and said annulus means and discharging into said supply chamber;
   a plurality of radial grooves formed in said annulus means at the interface and in fluid communication with said throat section;
   a first annular chamber located radially outward of, and in fluid communication with, said radial grooves and including a portion defining a first annular contaminant collection groove;
   first fluid passage means providing a fluid path from said first annular chamber to said source of lubricant;
   a second annular contaminant collection groove formed in said annulus means radially outward of the diverging portion of said converging-diverging flow path and defining the circumferential extent of said converging-diverging flow path and defining a portion of said supply chamber; and
   at least one oil galley having an axially extending portion radially spaced from said axis and in fluid communication with said supply chamber for receiving lubricant therefrom and supplying said lubricant to a lubricant distribution system.

2. The system of claim 1 further including:
   a second annular chamber located radially outward of said crankshaft means;
   a third annular contaminant collection groove located at the bottom of said second annular chamber;
   a radial bore extending from each of said at least one oil galley to said second annular chamber; and
   second fluid passage means providing a fluid path from said second annular chamber.

3. The system of claim 2 further including a bore in fluid communication with said supply chamber and having at least a portion coaxial with said axis whereby refrigerant separated from said lubricant is vented.

4. The system of claim 1 further including a bore in fluid communication with said supply chamber and having at least a portion coaxial with said axis whereby refrigerant separated from said lubricant is vented.

* * * * *